United States Patent [19]
Phipps

[11] Patent Number: 5,917,582
[45] Date of Patent: Jun. 29, 1999

[54] FILM CARRIER WITH MAGNETIC SLIDER

[76] Inventor: Troy H. Phipps, 12830 St. Andrews Dr., Oklahoma City, Okla. 73120

[21] Appl. No.: 09/083,527

[22] Filed: May 22, 1998

[51] Int. Cl.⁶ .................................................. G03B 27/62
[52] U.S. Cl. ............................................................. 355/75
[58] Field of Search ........................ 355/75, 76; 352/221, 352/224

[56] References Cited

U.S. PATENT DOCUMENTS

| | | | |
|---|---|---|---|
| 2,199,305 | 4/1940 | Dewey | 88/24 |
| 2,353,241 | 7/1944 | Hughey | 88/24 |
| 2,834,273 | 5/1958 | Bartilotta | 95/77 |
| 2,985,068 | 5/1961 | Ness | 88/24 |
| 3,194,114 | 7/1965 | Weinberg | 88/24 |
| 3,604,328 | 9/1971 | Nakagawa | 355/75 |
| 3,950,095 | 4/1976 | Bouygues et al. | 355/72 |
| 4,353,646 | 10/1982 | Bartel et al. | 355/76 |
| 4,736,228 | 4/1988 | Ito | 355/75 |
| 5,343,273 | 8/1994 | Yamamoto et al. | 355/75 |
| 5,619,305 | 4/1997 | Yamamoto et al. | 355/75 |
| 5,663,786 | 9/1997 | Miyamori | 355/72 |
| 5,668,625 | 9/1997 | Bocklisch et al. | 355/73 |

*Primary Examiner*—Alan A. Mathews
*Attorney, Agent, or Firm*—Limbach & Limbach L.L.P.

[57] ABSTRACT

A film carrier (1) for use with photographic enlargers has a base plate (1) with base runners (3) and a slider (8) with slider runners (9). Slider runners (9) and base runners (3) contact only the edges of the film strip, allowing the image portion of the film strip to remain untouched by the film carrier. Permanent magnets (4) embedded in base plate (1) attract steel strips (10) embedded in slider (8), thus causing slider (8) to be attracted to base plate (1). This magnetic force secures the film strip, placed between slider (8) and base plate (1), in the film carrier. A frictive coating (11) on slider runners (9) allows the film strip to move with slider (8) to facilitate the alignment of the image to be printed to opening (5).

12 Claims, 4 Drawing Sheets

FILM CARRIER WITH MAGNETIC SLIDER

BACKGROUND—FIELD OF INVENTION

This invention relates to a film carrier or film holder, commonly referred to as a negative carrier, and has particular application to such a film carrier adapted for use with a photographic enlarger.

BACKGROUND—DESCRIPTION OF PRIOR ART

When making photographic prints, a film carrier is used for holding or pressing photographic film while it is printed in a photographic enlarger. Typical film carriers, such as the basic Beseler model (available from Charles Beseler Co., Linden, N.J.), consist of a mask plate and a press plate. The mask plate holds the film in place as well as blocks light so that only a single image on a film strip is printed. The press plate presses the photographic film onto the mask plate. On the mask plate are four pins which aid in holding and aligning an image to the mask plate opening. While the photographic film is transported, the film press plate is displaced away from the mask plate to prevent damage to the photosensitive emulsion layer of the photographic film. There are several disadvantages to using this device which result in increased loading times and damage to images.

The following difficulties in loading a film strip into the carrier and aligning an image to the mask plate opening result in increased loading time. First, the closing of the press plate often shifts the film strip, forcing one to reopen the press plate, realign an image to the mask plate opening, and close the press plate. Second, the shifting of the film strip when the mask plate is closed can also cause the film strip to come out from under one of the four pins. When this occurs, the user must lift the press plate, place the film strip under all four pins again, realign the image, and close the press plate, hoping that the film strip will not come out from under one of the pins again. Third, aligning an image with three or fewer images without touching the image portion of the filmstrip is difficult. To keep from touching the image portion of the film strip, users rely on grabbing the edges of the film strip which extend from the carrier. In this way, fingerprints only get onto the edges of the filmstrip where the sprocket holes are located and not onto the image area. However, a film strip of three or fewer images does not extend beyond the edges of the carrier, and a user is forced to spend an extra amount of time to align such a film strip.

A typical film carrier can damage film strips in several ways. First, the carrier can crimp the film if the film strip is not under all four pins when the press plate is closed. Such crimping occurs frequently both because the user cannot see well in the dim light of the darkroom and because the film strip shifts as the press plate is closed. Second, flattening the film strip by pressing it between two pieces of metal can damage the film. A user will often have to slide the film strip after the plates are closed in order to accurately align the image to the mask plate opening. Sliding the film between the closed plates can scratch the image. Third, the film strip often falls from the carrier because a leaf spring or other similar device forces the press plate away from the mask plate in order to minimize the time that the film strip is pressed between the two metal plates. Consequently, with the slightest release of pressure, the press plate moves away from the mask plate and the film strip is free to fall to the ground.

U.S. Pat. No. 4,736,228 to Ito (1988) uses a groove to facilitate the alignment of the top and bottom edges of an image to the opening, yet suffers from a number of disadvantages. First, there is no mechanism to assist in the alignment of the left and right edges of an image. Second, this film carrier, like the previously described film carriers, causes damage by flattening the film strip between two metal plates. Third, the alignment of the left and right edges of an image is especially difficult if the film strip is comprised of three or fewer images, because again alignment is reliant on a portion of the film strip extending from the device. Fourth, this film carrier contains many parts, adding complexity to the design and raising the cost of manufacture.

U.S. Pat. No. 5,343,273 to Yamamoto et al. (1994) uses magnets to hold the press plate to the mask plate and to hold both the press plate and the mask plate to the base plate. This film carrier, too, is disadvantageous for several reasons. First, this film carrier presses the film strip between two plates. Again, the negative is aligned to an opening and then the two plates are closed together. Consequently, the film strip can move as it is flattened, forcing the user to either slide the film strip between the closed plates or to repeatedly open the plates, adjust the image, and close the plates again until the image is aligned. Second, there is no guiding mechanism, such as the groove in Ito, to at least make aligning the top and bottom edges of an image to the opening simple.

Though U.S. Pat. No. 2,199,305 to Dewey (1940) shows recesses and slots which allow the top and bottom edges of the image to be aligned more easily and allow the image portion of the film strip to remain untouched, there are other disadvantages. First, there is no means for easily aligning the left and right edges of the image. Second, because springed rails are necessary to allow for variance in film thickness, the device is complex, resulting in a higher cost of manufacture.

U.S. Pat. No. 2,985,068 to Ness (1961) shows a slider which holds a film strip and moves along the film carrier frame. There are at least three disadvantages when using this carrier. First, an image on the film strip must be accurately aligned to a mark on the slider with no means for fine adjustment in the longitudinal direction which increases loading time. Second, as with some of the other film carriers described, the film strip can shift as it is flattened. As the upper section is placed on the lower section, it is likely that the image will shift forcing the user to repeatedly realign the image and replace the upper section. Third, the complexity of the design, including a two-piece slider and a four-piece base, increases the manufacturing costs.

Present film carriers suffer from one or more of the following disadvantages:

(a) The film carrier presses the image portion of the film strip between two plates, which can cause scratches or other damage.

(b) The means of aligning the image to the mask opening can damage the image portion of the film strip.

(c) A great deal of handling is required to secure the film strip in the carrier.

(d) The forcing of the press plate away from the mask plate allows the film strip to be dropped, resulting in damage to the images.

(e) Because the film strip is flattened after the image is aligned to the mask opening and because the flattening of the film strip often causes shifting, the user must reposition the image several times before it is properly aligned.

(f) The complexity of the design leads to high manufacturing costs.

(g) There is no simple means for aligning all four edges of the image to the mask plate opening.

(h) Because alignment is reliant on a portion of the film strip extending from the carrier, aligning a film strip with three or fewer images is difficult.

OBJECTS AND ADVANTAGES

Several objects and advantages of the present invention are:

(a) to provide a film carrier which does not contact the image portion of the film strip;

(b) to provide a film carrier which has a means for alignment that does not damage the image portion of the film strip;

(c) to provide a film carrier which requires minimum handling of the film strip by the user;

(d) to provide a film carrier which securely holds the film strip whenever the film strip is in the carrier;

(e) to provide a film carrier where all alignment of the image to the mask opening is done after the film strip is flattened;

(f) to provide a film carrier which is simple in design, thus keeping manufacturing costs to a minimum;

(g) to provide a film carrier which has a simple means for aligning the image to the mask opening;

(h) to provide a film carrier which can easily align a film strip with three or fewer images without requiring the user to touch the image.

SUMMARY OF THE INVENTION

In accordance with the present invention, a film carrier is provided for holding a photographic negative film. The film carrier includes a base plate and a slider member. The base plate has a channel formed in a top surface thereof and a pair of upwardly protruding base runners formed in the channel. The slider member is slidably engageable in the channel and includes a pair of downwardly protruding slider runners formed on a bottom surface of the slider that directly oppose the base runners. The slider runners have bottom surfaces formed of a first material that is less lubricous than a second material forming top surfaces of the base runners.

In accordance with another aspect of the present invention, the film carrier has a base plate and a slider member. The base plate includes a channel formed in a top surface thereof, a pair of upwardly protruding base runners formed in the channel and extending along a length thereof, and a mask opening formed in the base plate and between the base runners. The slider member is slidably engageable in the channel. The slider member includes a pair of downwardly protruding slider runners formed on a bottom surface of the slider that directly oppose the base runners when the slider is engaged in the channel. The slider runners have bottom surfaces formed of a first material that is less lubricous than a second material forming top surfaces of the base runners. A slider opening is formed in the slider member between the slider runners. When a photographic negative film is disposed in the channel between the base plate and the slider member, with the base runners and the slider runners engaging edges of the film therebetween, and the slider is slid along the channel, the film slides along the channel relative to the mask opening.

Other objects and features of the present invention will become apparent by a review of the specification, claims and appended figures.

DETAILED DESCRIPTION OF THE PREFFERED EMBODIMENT

Figure 1:
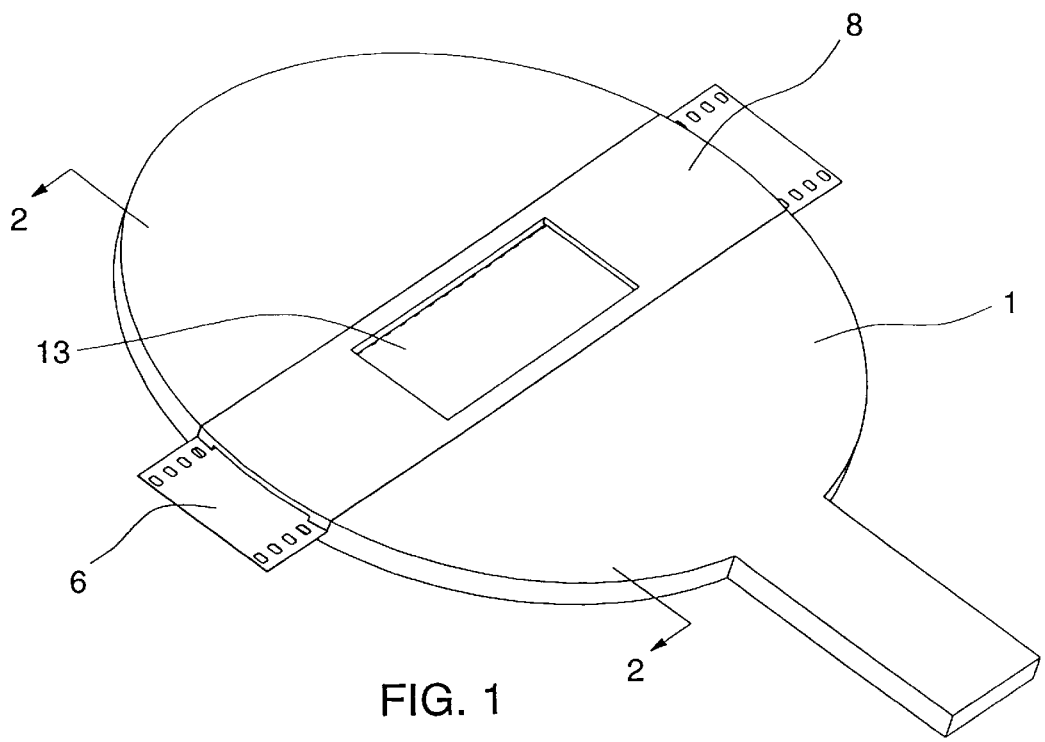
FIG. 1 shows a perspective view of the film carrier according to the present invention.
Figure 2:
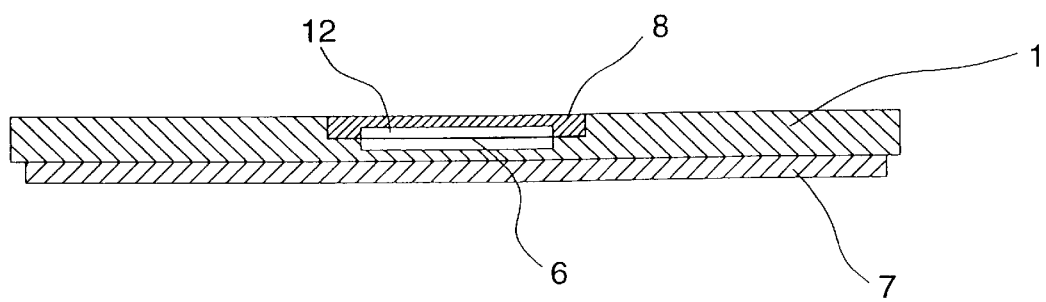
FIG. 2 shows a cross-sectional view of the film carrier shown in FIG. 1.
Figure 3A:
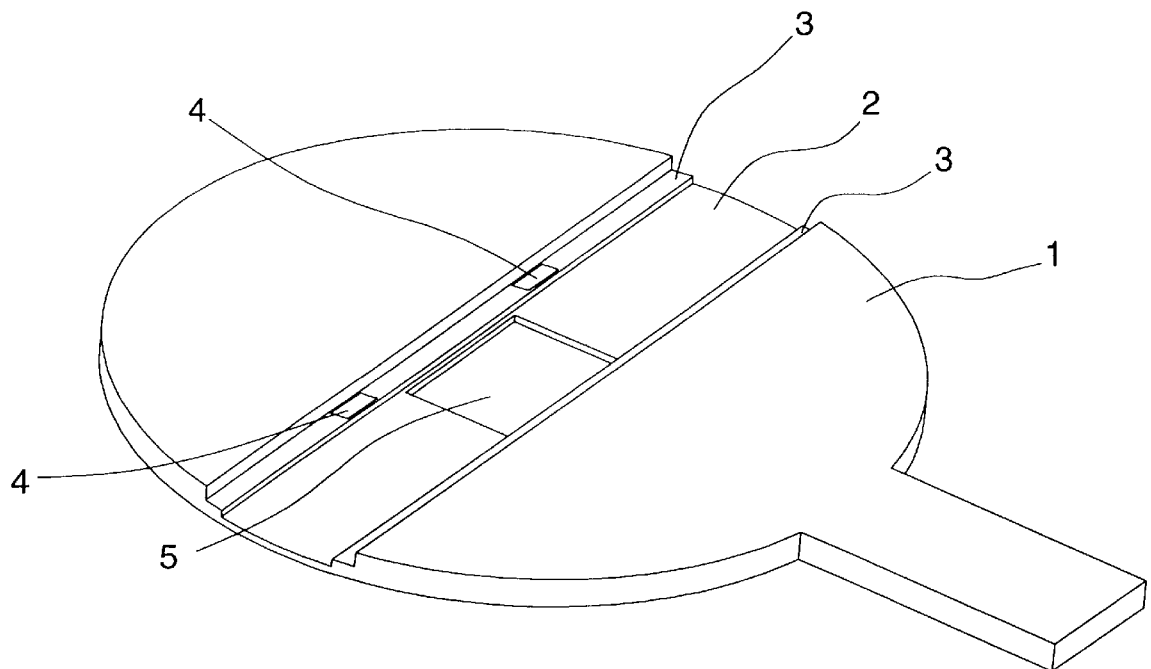
FIGS. 3A and 3B show perspective views of the top and bottom of the base plate, respectively.
Figure 3B:
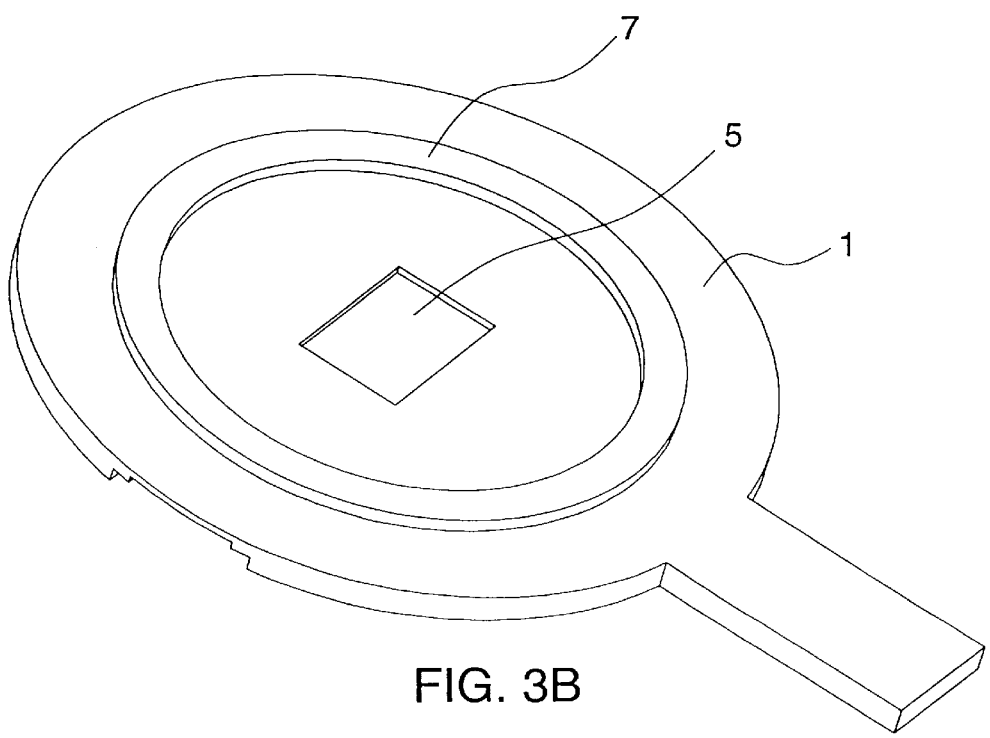

As shown in FIGS. 1 and 2, the film carrier of the present invention is constructed of a base plate 1 and a slider member 8 which are made preferably of an injection-molded plastic. Base plate 1, better shown in FIGS. 3A and 3B, consists of a guide channel 2 which guides slider 8. Guide channel 2 is approximately the same width as the film 6 to be enlarged. For example, with 35 mm film, guide channel 2 and slider 8 are approximately 35 mm wide. Base runners 3 are slightly narrower than the distance from the edge of the film strip 6 to the edge of the images on the film strip which is approximately 4 mm for 35 mm film. Permanent magnets 4, such as rare earth magnets, are embedded within base runners 3. A mask opening 5 having approximately the same dimensions as the image to be enlarged is formed between the base runners 3. For 35 mm film, mask opening 5 would be approximately 10 mm by 36 mm. On the back of base plate 1, shown in FIG. 3B, is a ring 7 used for aligning the center of mask opening 5 to the center optical axis of the enlarger.

Figure 4A:
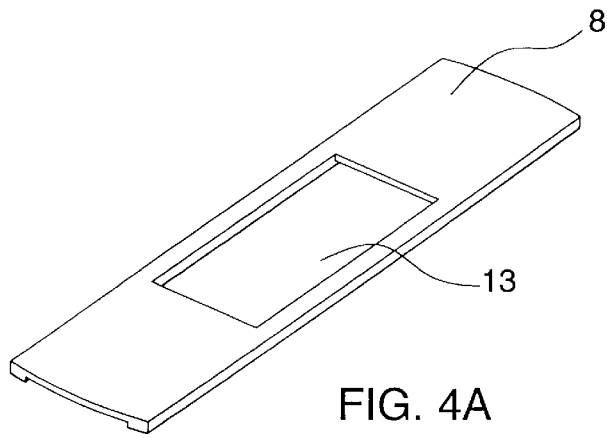
FIGS. 4A and 4B show perspective views of the top and bottom of the slider, respectively.
Figure 4B:
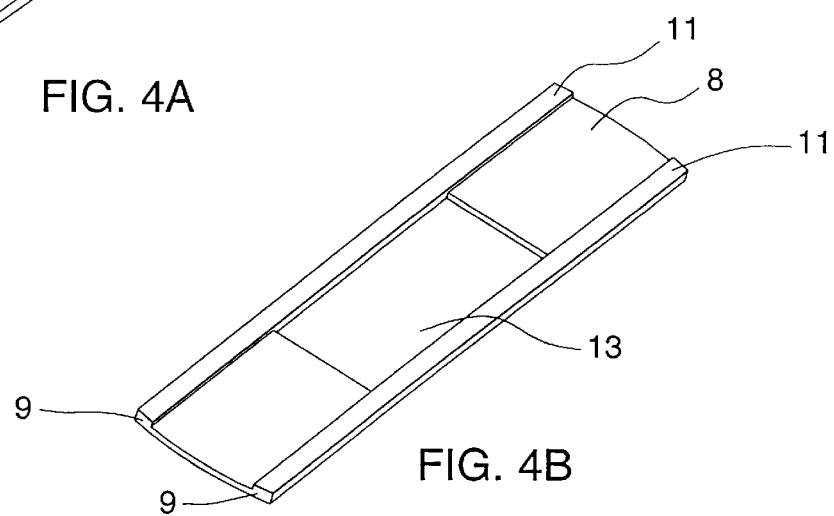
Figure 5:
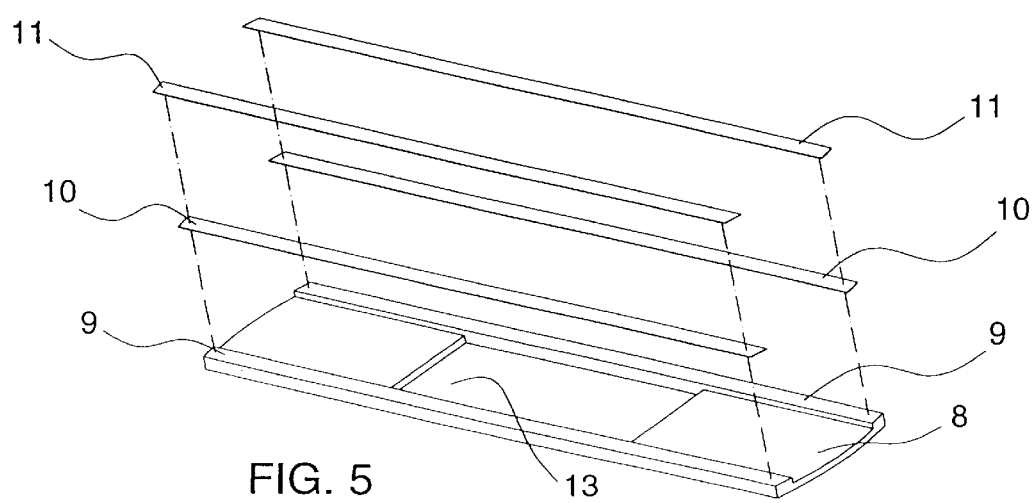
FIG. 5 shows an exploded view of the slider showing the laminated frictive layer and steel strips.

Slider 8 is shown in FIGS. 4A, 4B, and 5. FIG. 4A shows the top of slider 8. Slider 8 is approximately the width of the film—35 mm for 35 mm film—but is slightly narrower than guide channel 2. Slider 8 has a slider opening 3 extending between the slider runners 9, and which is longer than mask opening 5 for alignment therewith as slider 8 slides relative in guide channel 2 of base plate 1. The thickness of slider 8 is approximately equal to the distance from the top of base runners 3 to the top of base plate 1, so that when slider 8 is placed on slider runners 3 in guide channel 2, the top of slider 8 is flush with the top of base plate 1, and slider opening 3 overlaps with mask opening 5 as slider 8 slides in guide channel 2. FIG. 4B shows slider runners 9 on the bottom of slider 8. Slider runners 9 are approximately the same width as base runners 3. Embedded within slider runners 9 are steel strips 10. FIG. 5 shows an exploded view of slider 8 which includes a frictive coating 11 applied to slider runners 9. The frictive coating, such as polyvinyl chloride, is less lubricous than the plastic base runners 3.

Figure 6A:
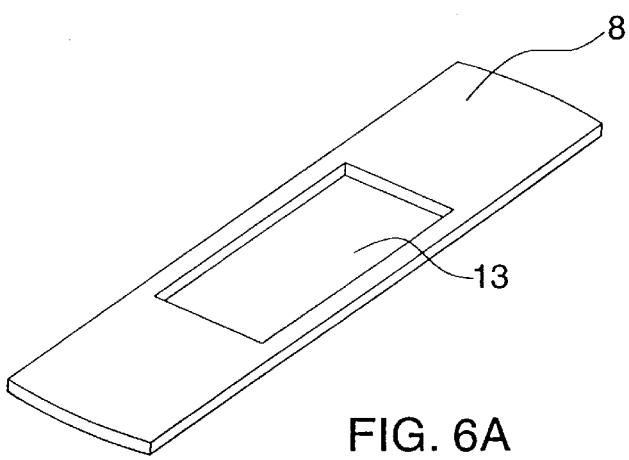
FIGS. 6A and 6B show perspective views of the top and bottom of an alternate embodiment of the slider member, respectively.
Figure 6B:
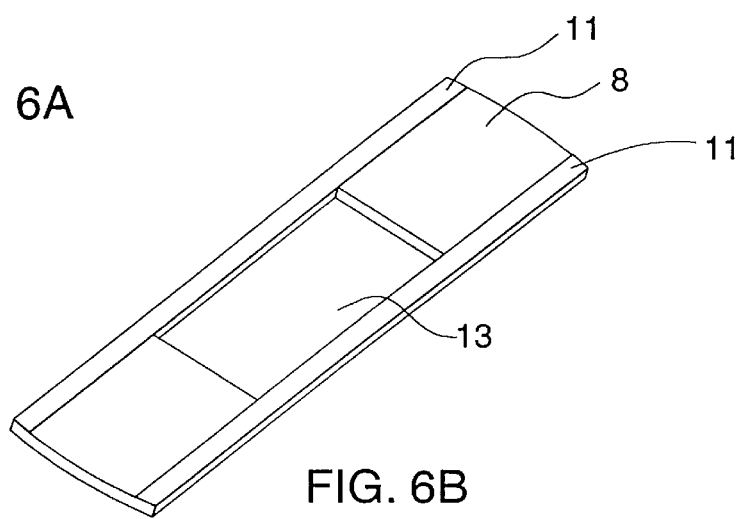

FIGS. 6A and 6B illustrate an alternate embodiment of the present invention, where slider 8 has no runners on its bottom surface, but instead has the frictive coating 11 applied to part (FIG. 6B) or all of the bottom surface of slider 8. While the lack of slider runners allows the image portion of the film to contact slider 8, the image portion of most films should not be damaged as long as the film does not slide relative to slider 8 (which the frictive coating 11 will prevent).

Operation

To align an image with mask opening 5, one first places the film strip in guide channel 2 so that the edges of the film strip rest on base runners 3. Then, slider 8 is placed on top of the film strip in guide channel 2. Slider 8 is magnetically attracted to base plate 1 due to the attraction of magnets 4 in base plate 1 to steel strips 10 in slider 8. This magnetic force is sufficient to hold the film strip 6 in place. Unlike many other film carriers, this force secures the film strip in the film carrier, even when the film carrier is not held by the user or placed in the enlarger, thus protecting the film strip from falling to the ground.

The top and bottom edges of the image are self-aligned. Because the width of guide channel 2 is approximately the same width as the film strip, the edges of the film strip are aligned to the edges of guide channel 2 which are parallel to mask opening 5. Because base runners 3 are more lubricous than the frictive coating 11 on slider runners 9, the film strip moves with slider 8 in relation to mask opening 5. Consequently, one simply moves slider 8 left and right to align the left and right edges of the image to mask opening 5. Unlike many other film carriers, this invention allows the user to align the image to mask opening 5 without touching the film strip. This reduces the amount of handling and thus the number of fingerprints on the images. Furthermore, because slider 8 moves the image during alignment, one does not need to rely on a portion of the film strip to extend from the carrier and printing film strips with three or fewer images is easier.

Slider runners 9 and base runners 3 suspend the image portion of the film strip in a gap 12. In this way, the film carrier contacts the film strip only along the edges of the film strip, leaving the image portion of the film strip untouched.

Conclusions, Ramifications, and Scope of Invention

Accordingly, the film carrier of the present invention can be used to hold a film strip in a photographic enlarger with minimal alignment time, minimal handling of the film strip, and minimal damage to the film strip. The film carrier of the present invention has the following advantages:

it provides a film carrier which does not contact the image portion of the film strip;

it provides a film carrier which has a means for alignment that does not damage the image portion of the film strip;

it provides a film carrier which requires a minimum of handling of the film strip by the user;

it provides a film carrier which securely holds the film strip without damage;

it provides a film carrier where the alignment of the image to the mask opening is done after the image is flattened;

it provides a film carrier that has a simple means for aligning an image to the mask opening; and it provides a film carrier which can easily align a film strip of three or fewer images.

While the present invention has been described in detail above with reference to a preferred embodiment shown in the drawings, it will be apparent to those skilled in the art that various changes and modifications thereto are possible without departing from the scope of the invention as defined by the appended claims. For instance, the embodiment as described is for use with a 35 mm photographic enlarger, and specifically a Beseler 35 mm photographic enlarger. However, the present invention can be made for film formats other than 35 mm, and for brands of enlargers other than Beseler. Furthermore, the film carrier can be made of other non-plastic materials, so long as the frictive coating is less lubricous than the material used to form the base runners 3. The slider member could in fact be entirely made out of the frictive material. Lastly, the magnets 4 could instead be embedded within the slider runners 9 to attract steel strips formed in the base runners 3, or the actual material used to form the base runners.

Thus the scope of the invention should be determined by the appended claims and their legal equivalents, rather than by the examples given.

What is claimed is:

1. A film carrier for holding a photographic negative film, comprising:

a base plate including a channel formed in a top surface thereof, and a pair of upwardly protruding base runners formed in the channel; and a slider member slidably engageable in the channel, the slider member including a pair of downwardly protruding slider runners formed on a bottom surface of the slider that directly oppose the base runners, the slider runners having bottom surfaces formed of a first material that is less lubricous than a second material forming top surfaces of the base runners.

2. The film carrier of claim 1, wherein the first material is a layer of material adhered to bottom surfaces of the slider runners.

3. The film carrier of claim 1, further comprising:

magnets formed in at least one of the base runners and slider runners to magnetically attract the slider member to the base plate.

4. The film carrier of claim 1, further comprising:

magnets formed in one of the base runners and the slider runners; and steel strips formed in the other of the base runners and the slider runners to magnetically attract the slider member to the base plate.

5. A film carrier for holding a photographic negative film, comprising:

a base plate including:
      a channel formed in a top surface thereof,
      a pair of upwardly protruding base runners formed in the channel and extending along a length thereof, and
      a mask opening formed in the base plate and between the base runners; and a slider member slidably engageable in the channel, the slider member including:
      a pair of downwardly protruding slider runners formed on a bottom surface of the slider that directly oppose the base runners when the slider is engaged in the channel, the slider runners having bottom surfaces formed of a first material that is less lubricous than a second material forming top surfaces of the base runners, and
      a slider opening formed in the slider member and between the slider runners;

wherein when a photographic negative film is disposed in the channel between the base plate and the slider member, with the base runners and the slider runners engaging edges of the film therebetween, and the slider member is slid along the channel, the film slides along the channel relative to the mask opening.

6. The film carrier of claim 5, wherein the first material is a layer of material adhered to bottom surfaces of the slider runners.

7. The film carrier of claim 5, further comprising:

magnets formed in at least one of the base runners and slider runners to magnetically attract the slider member to the base plate.

8. The film carrier of claim 5, further comprising:

magnets formed in one of the base runners and the slider runners; and steel strips formed in the other of the base runners and the slider runners to magnetically attract the slider member to the base plate.

9. A film carrier for holding a photographic negative film, comprising:

a base plate including:
a channel formed in a top surface thereof,
a pair of upwardly protruding base runners formed in the channel and extending along a length thereof, and
a mask opening formed in the base plate and between the base runners; and a slider member slidably engageable in the channel, the slider member including:
a bottom surface that directly opposes the base runners when the slider is engaged in the channel, the slider bottom surface is formed of a first material that is less lubricous than a second material forming top surfaces of the base runners, and
a slider opening formed in the slider member;

wherein when a photographic negative film is disposed in the channel between the base plate and the slider member, with the base runners and the slider bottom surface engaging the film therebetween, and the slider member is slid along the channel, the film slides along the channel relative to the mask opening.

10. The film carrier of claim 9, wherein the first material is a layer of material adhered to the bottom surface of the slider member.

11. The film carrier of claim 9, further comprising:

magnets formed in at least one of the base runners and the slider member to magnetically attract the slider member to the base plate.

12. The film carrier of claim 9, further comprising:

magnets formed in one of the base runners and the slider member; and steel strips formed in the other of the base runners and the slider member to magnetically attract the slider member to the base plate.

* * * * *